United States Patent [19]
Branstrom

[11] Patent Number: 5,077,968
[45] Date of Patent: Jan. 7, 1992

[54] VANELESS CONTRAROTATING TURBINE

[75] Inventor: Bruce R. Branstrom, Palm Beach Gardens, Fla.

[73] Assignee: United Technologies Corporation, Hartford, Conn.

[21] Appl. No.: 505,738

[22] Filed: Apr. 6, 1990

[51] Int. Cl.⁵ .............................................. F02K 9/48
[52] U.S. Cl. .................................. 60/259; 60/39.162; 417/381
[58] Field of Search ............... 60/39.162, 259, 268, 60/39.75; 417/379, 381

[56] References Cited

U.S. PATENT DOCUMENTS

| | | | |
|---|---|---|---|
| 3,391,540 | 7/1968 | Bauger et al. | 60/226 |
| 3,818,695 | 6/1974 | Rylewski | 60/268 |
| 4,463,553 | 8/1984 | Boudigues | 60/268 |
| 4,771,600 | 9/1988 | Limerick et al. | 60/259 |
| 5,014,508 | 5/1991 | Lifka | 60/268 |

FOREIGN PATENT DOCUMENTS 587528 4/1947 United Kingdom .
2099082 12/1982 United Kingdom .

Primary Examiner—Louis J. Casaregola
Attorney, Agent, or Firm—Edward L. Kochey, Jr.

[57] ABSTRACT

First turbine stage 14 rotates at low speed, doing moderate work, and driving a low pressure pump (22). Second turbine stage 16 rotates at high speed, doing a major portion of the work, and drives a high pressure pump (28). The low speed pump is compatible with suction requirements, and the second turbine stage does the substantial work at high efficiency.

4 Claims, 3 Drawing Sheets

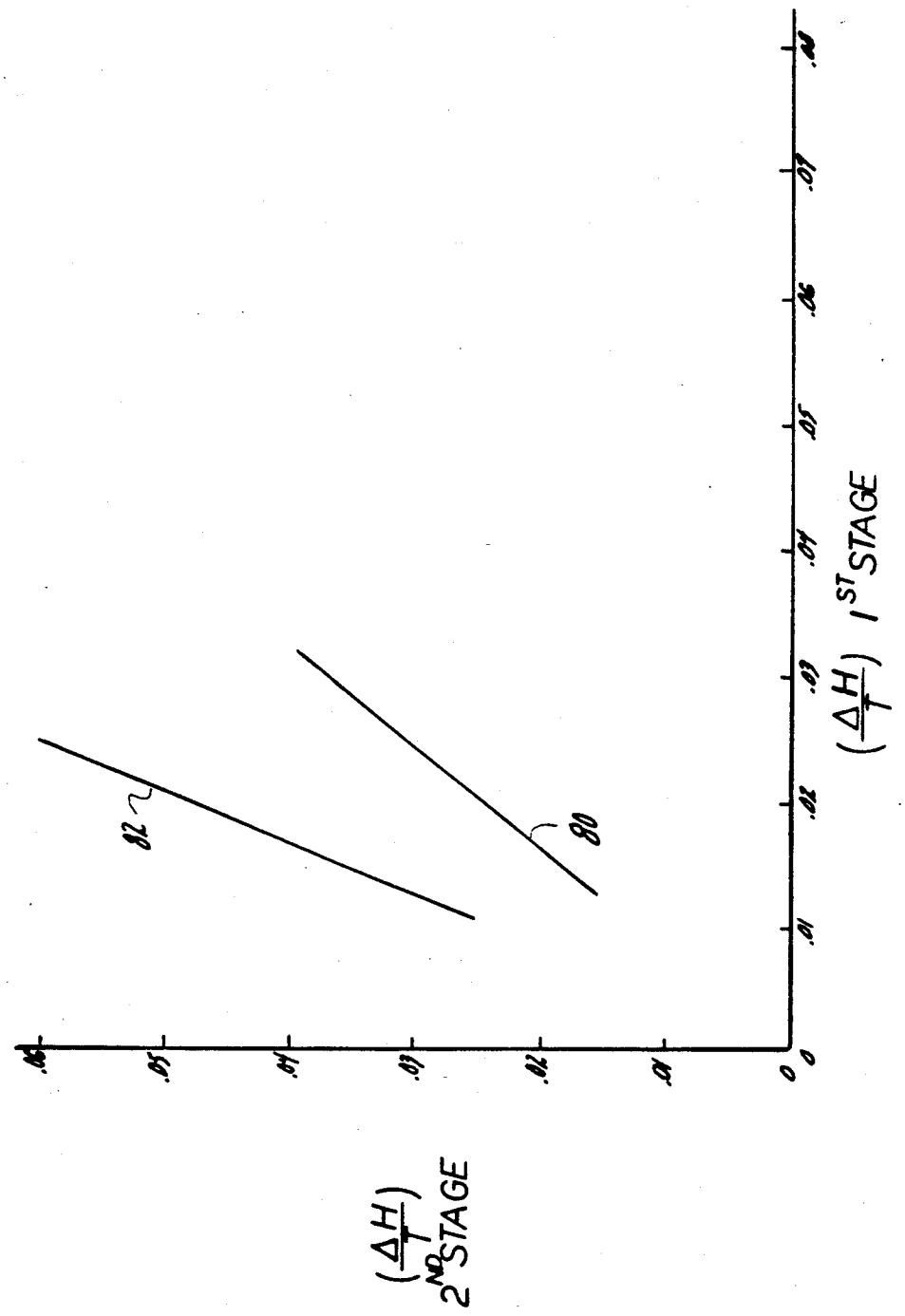

VANELESS CONTRAROTATING TURBINE

TECHNICAL FIELD

The invention relates to high temperature turbines and in particular to a vaneless turbine with contrarotating stages driving separate apparatus.

BACKGROUND OF THE INVENTION

For maximum efficiency it is desirable to operate gas turbines at an ultimate maximum temperature. This pushes the materials to their limits with many attempts being made to find ways to limit peak metal temperatures.

A local hot streak of gas may exhaust from the combustor, and with fixed vanes this can exceed the tolerable metal temperature of a vane sitting in this hot streak. Since the turbine blades are rotating they do not experience the soaking in such a high temperature location.

Gases conventionally pass through the turbine vanes or blades then through openings in the blades for the purpose of cooling. This is conventional film cooling where the exiting gas is carefully introduced to form a protective film over the surface of the blades or vanes. In obtaining such cooling gas, it must necessarily be withdrawn from areas where it could be more effectively used to produce power.

For gas turbine apparatus and flying vehicles weight is considerably important and any reduction in weight of the gas turbine can result in substantial pay off.

Previous turbine cooling studies for actively cooled rocket turbines have shown little or no payoff even assuming the most optimistic cooling effectiveness. The extensive cooling air required and the weight requirements in proportion to the weight of the turbine have not been shown to be productive.

SUMMARY OF THE INVENTION

A high temperature gas turbine has no vanes and accordingly flow enters the first turbine stage (blade) axially. This first turbine stage is designed to rotate at low velocity with a velocity ratio of less than 0.5, and does moderate work with the work factor of less than 0.033. The gas discharges from this first turbine stage at an angle of less than 30 degrees from the circumferential direction.

A second turbine stage receives this gas with the second turbine stage operating at a high velocity with a velocity ratio greater than 0.5. The second turbine stage also performs a major portion of the work with a work factor greater than 0.06.

The low wheel speed velocity first turbine stage is matched with a low pressure compressor or pump where the low speed is compatible with the suction requirements of these low pressure stages. The second stage operating at high wheel speed velocity is matched with the high pressure compressor, which receives its fluid from the low pressure compressor, where substantial work is effectively done at higher efficiency because of the high rotating velocity Since vanes do not exist not only is the weight of these vanes saved, there is no cooling flow requirement to protect the vanes. There are no stationary turbine parts to burn out behind a combustor having a hot streak. High turbine efficiencies are achieved without the loss inherent in passing through turning airfoil vanes. A more compact arrangement is achieved requiring less length.

BRIEF DESCRIPTION OF THE DRAWINGS

FIG. 3 is a curve illustrating work limits for contrarotating vaneless turbines.

DESCRIPTION OF THE PREFERRED EMBODIMENT

Figure 1:
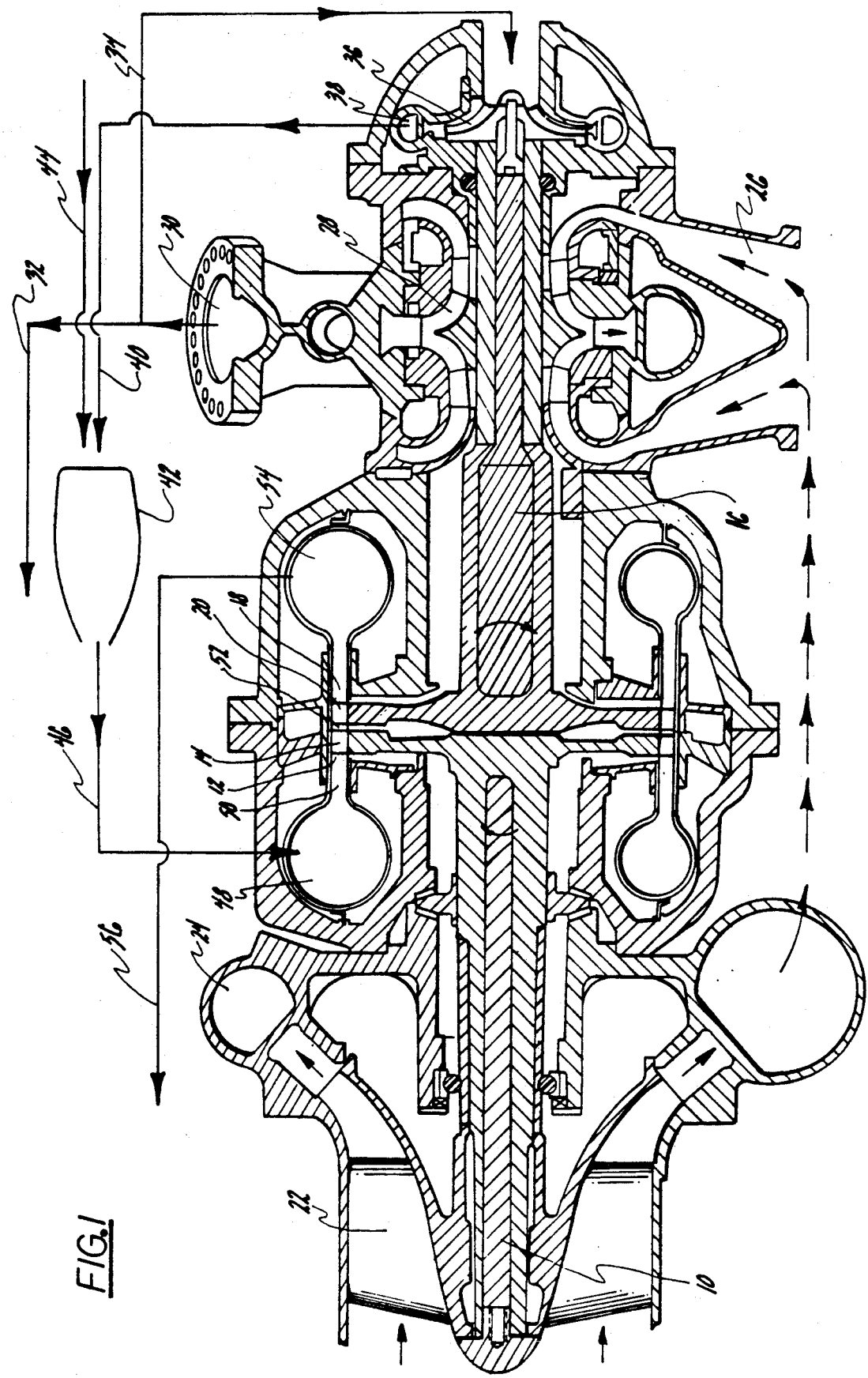
FIG. 1 illustrates the contrarotating turbine driving a turbo pump system.

Referring to FIG. 1 a first low speed shaft is driven by first turbine stage 12 formed of first stage blades 14. A second high speed rotating shaft 16 is driven by the second turbine stage 18 formed of second stage blades 20.

Connected to the low speed shaft 10 is a low pressure liquid oxygen boost pump 22 inducing a flow of oxygen and discharging it to intermediate pipe 24 at 867 psi. This flow of liquid oxygen is then passed to the inlet 26 of the high pressure oxygen pump 28. This high pressure pump is connected to the high speed shaft 16 and discharges the oxygen through line 30 at 5,811 psi. The majority of this flow passes through line 32 for use in a propulsion nozzle. A portion passes through line 34 into further compressor 36, which is also operating at high speed. From pump discharge line 38 where the pressure is 9,000 psi it passes through line 40 to combustor 42.

Hydrogen at high pressure is applied to line 44 from another pumping system somewhat similar to the one herein described The hot gas from the combustor passed through line 46 at about 9900 psi and a temperature of 3500 degrees Rankine. It enters the torroidal inlet chamber 48 from which it passes axially of the turbine through inlet annulus 50.

First stage blading 14 is operating at low speed and designed to a moderate amount of work with gas exiting to the inner stage location 52 at 3,090 degrees Rankine. From here it passes through the second stage 18 into the exit torus 54, then exiting through line 56 to the thruster nozzle, not shown. The second stage 18 is operating at high rotating velocity and does a major portion of the work.

Figure 2:
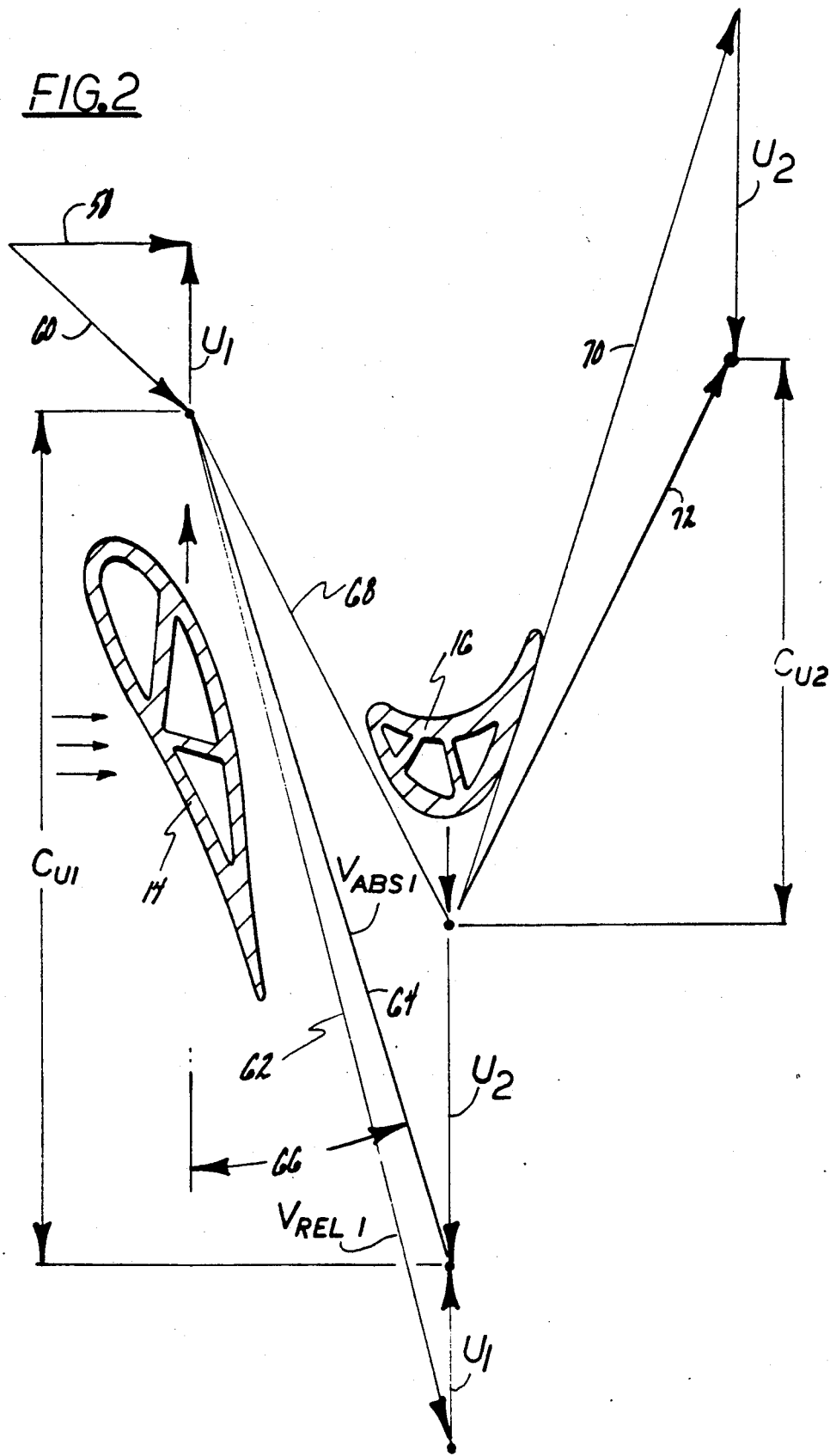
FIG. 2 illustrates typical cross sections of the blades of the first and second stage, and a velocity diagram.

FIG. 2 illustrates first stage blade 14 and second stage blade 16 in more detail along with the velocity diagram. The first stage is rotating with the blade velocity of $U_1$ and with gas at an inlet gas velocity 58 passing through inlet 50. The relative gas velocity with respect to the blade 14 is shown by line 60. The velocity ratio of this stage ($U/C_o$), which is the velocity of the blade divided by the velocity equivalent of the work energy consumed is ($C_o 2gJ\Delta h_w$), less than 0.5. A well known work (mach number limited) parameter for a turbine stage is that of delta enthalpy (h) divided by the inlet temperature in degrees Rankine. On this basis the work parameter for the first stage is 0.03 and in air should generally be less than 0.033 in order to be vaneless This limit will be different for various fluids, since it is sonic velocity and specific heat related.

Line 62 represents the exit gas velocity from the stage relative to blade 14. Line 64 therefore represents the absolute gas velocity leaving the first stage and angle 66 which is the angle of the discharge with respect to the circumferential direction of the blade is less than 30 degrees. $C_{U1}$ represents the change in actual velocity of the gas in passing through the first stage. The work of the first stage is a function of this change in circumferential velocity $C_{U1}$ multiplied by the speed of the blade ($U_1$).

Line 64 representing the absolute velocity leaving the first stage also represents the absolute velocity entering the second stage where $U_2$ represents the velocity of blade 16. The vector velocity relative to blade 16 is therefore illustrated by line 68. The gas exit from blade 16 is illustrated by line 70, and where combined with the velocity $U_2$ of blade 16 results in an absolute velocity 72 from the second stage.

The change in circumferential velocity of the second stage is the sum of $C_{U2}$ representing discharge velocity in one direction plus $C_{U1}$ which was the initial inlet velocity in the other direction. The sum is multiplied by $U_2$ which is the velocity or wheel speed of the second stage to obtain the work performed in this stage. It can be seen that substantially more work is done in this second stage not only because of the higher wheel velocity but also because of the greater change in circumferential gas velocity.

FIG. 3 is a plot of two curves against the first stage work factor. Curve 80 represents a low velocity first stage driving the high pressure compressor (HPC). For reasons of pressure recovery, a gas velocity of mach number 0.6 is considered a practicable limit for the exit absolute velocity. For first stage work factor shown along the abscissa, the ordinant represent the maximum work which could be taken out of the gas at the second stage before reaching the velocity limit of mach 0.6. It can be seen that for first stage work factor of 0.025 the second stage work factor is limited to 0.031 because very little residual absolute velocity is left behind the high velocity first stage to do work in the second stage. Total work is limited to a 0.056 overall work factor.

Curve 82 represents a similar curve for a low wheel speed first stage shaft. Here it is seen that a work factor of 0.025 to the first stage permits a work factor of 0.06 to the second stage resulting in a total work of 0.085. Accordingly, this combination of a low velocity and low wheel speed first stage with the high speed second stage permits more work to be extracted from a two stage turbine.

The slow speed first stage is also coupled with a low pressure pump or compressor where low speed is preferable because of the required maintenance of appropriate inlet conditions. The high speed second stage is coupled with a high pressure pump or compressor where increased efficiency is achieved with this high speed.

I claim:

1. A completely vaneless turbine apparatus comprising
   a first low speed rotating shaft;
   a low pressure pump or a compressor on said first shaft;
   a second high speed contrarotating shaft;
   a high pressure pump compressor on said second shaft, and receiving fluid from said low pressure pump or compressor;
   a combustor producing hot gas;
   a first turbine reaction low speed stage receiving hot gas from said combustor and secured to said first low speed shaft;
   a second turbine high speed stage receiving gas from said first stage and connected to said second high speed shaft;
   said first turbine stage having a velocity ratio of less than 0.5; and
   said second turbine stage having a velocity ratio greater than 0.5.

2. A vaneless turbine as in claim 1:
   the discharge of gas from said first stage being less than 30 degrees from the circumferential direction.

3. A vaneless turbine as in claim 2:
   the work factor of said first stage being less than 0.033 BTU per pound/degree Rankine;
   the work factor of said second stage being greater than 0.06 BTU's per pound/degree Rankine;
   where work factor is defined as delta enthalpy divided by temperature in degrees Rankine.

4. A vaneless turbine as in claim 1:
   the work factor of said first stage being less than 0.033 BTU per pound/degree Rankine;
   the work factor of said second stage being greater than and 0.6 BUT's per pound/degree Rankine;
   where work factor is defined as delta enthalpy divided by temperature and degrees Rankine.

* * * * *

UNITED STATES PATENT AND TRADEMARK OFFICE
CERTIFICATE OF CORRECTION

PATENT NO. : 5,077,968

DATED : January 7, 1992

INVENTOR(S) : Bruce R. Branstrom

It is certified that error appears in the above-identified patent and that said Letters Patent is hereby corrected as shown below:

Column 1, after the title, insert the following paragraph:

-- The Government has rights in this invention pursuant to a contract awarded by the Department of the Air Force. --

Signed and Sealed this

Twentieth Day of July, 1993

Attest:

MICHAEL K. KIRK

*Attesting Officer*  *Acting Commissioner of Patents and Trademarks*